(12) United States Patent
Lindgren

(10) Patent No.: US 9,045,566 B2
(45) Date of Patent: Jun. 2, 2015

(54) METHOD FOR THE MANUFACTURE OF AGAROSE GELS

(75) Inventor: Göran Lindgren, Almunge (SE)

(73) Assignee: Bio-Works Technologies AB, Uppsala (SE)

( * ) Notice: Subject to any disclaimer, the term of this patent is extended or adjusted under 35 U.S.C. 154(b) by 1191 days.

(21) Appl. No.: 12/598,001

(22) PCT Filed: Apr. 29, 2008

(86) PCT No.: PCT/SE2008/050488
§ 371 (c)(1),
(2), (4) Date: Oct. 28, 2009

(87) PCT Pub. No.: WO2008/136742
PCT Pub. Date: Nov. 13, 2008

(65) Prior Publication Data
US 2010/0084345 A1    Apr. 8, 2010

Related U.S. Application Data

(60) Provisional application No. 60/915,976, filed on May 4, 2007.

(51) Int. Cl.
C08B 37/00 (2006.01)

(52) U.S. Cl.
CPC .................................. *C08B 37/0039* (2013.01)

(58) Field of Classification Search
CPC .................................................. C08B 37/0039
USPC ................... 210/635, 656, 659, 198.2, 502.1; 502/404, 439
See application file for complete search history.

(56) References Cited

U.S. PATENT DOCUMENTS

| | | | |
|---|---|---|---|
| 3,507,851 | A | 4/1970 | Ghetie et al. |
| 3,753,972 | A | 8/1973 | Yaphe et al. |
| 3,860,573 | A | 1/1975 | Honkanen et al. |
| 3,959,251 | A * | 5/1976 | Porath et al. ............... 536/123.1 |
| 4,665,164 | A | 5/1987 | Pernemalm et al. |
| 4,973,683 | A | 11/1990 | Lindgren |
| 5,998,606 | A | 12/1999 | Grandics |
| 6,322,814 | B1 | 11/2001 | Miller |
| 6,537,793 | B2 * | 3/2003 | Blanche et al. ............... 210/656 |
| 6,602,990 | B1 | 8/2003 | Berg |
| 2008/0154031 | A1 | 6/2008 | Berg et al. |

FOREIGN PATENT DOCUMENTS

| | | |
|---|---|---|
| GB | 1352613 A | 5/1974 |
| HU | 55805 | 6/1991 |
| SU | 833986 | 5/1981 |
| WO | 94/04192 | 3/1994 |

OTHER PUBLICATIONS

PTO Translation No. 12-1817 of SU 19810530 dated Jan. 2012.*
Wikipedia definition of Epichlorohydrin, undated.*
Laas, J. Chromatog. 66(2) (1972) 347-55. Agar derivatives for chromatography, electrophoresis, and gel-bound enzymes. II. Charge-free agar. ISSN:021-9673.
Lim et al., J. Microbiol. Biotechn. 14(4) (2004) 777-782. Overexpression of arylsulphatase in *E. coli* and its application to desulphation of agar. ISSN: 1017-7825.
Porath et al., J. Chromatog. 60(2) (1971) 167-77. Agar derivatives for chromatography, electrophoresis, and gel-bound enzymes. Desulphated and reduced cross-linked agar and agarose in spherical bead form. ISSN: 0021-9673.
Porath et al, J Chromatog. 103 (1975) 49-62 Agar derivatives for chromatography, electrophoresis, and gel-bound enzymes. Rigid gels cross.linked with divinyl sulphone.
Bernstein et al, "Distribution of Heparinase covalently immobilized to agarose experimental and theoretical studies", Biotechnology and Bioengineering, 30(2):196-207 (1987).
Porath et al, "Immobilzation of enzymes to agar, agarose, and Sephadex supports", Methods in Enzymology, 44:19-45 (1976).

* cited by examiner

*Primary Examiner* — Ernest G Therkorn
(74) *Attorney, Agent, or Firm* — Porter Wright Morris & Arthur LLP

(57) ABSTRACT

A method for the manufacture of an agarose separation gel: The method is characterized in comprising the steps of: i) providing a solution of agar, and ii) one, two or more substeps (ii.A, ii.B, ii.C etc) which each comprises desulphating thereby transforming agar to agarose having a degree of substitution of sulphate groups that is at most 75% of the degree of substitution of sulphate groups in native agar, iii) gelling the dissolved agar prior to step (ii) and/or securing so that the desulphated agar is in gel form at least after one or more of the substeps of step (ii), and imperatively after step (ii). An agarose separation gel that exhibits a. a plurality of methoxy groups each of which are at the same position as in native agar and with a degree of substitution in the range of 1-100% of the degree of substitution of native agar, and b. sulphate groups with a degree of substitution which is <75% of the degree of substitution for sulphate groups in native agar.

20 Claims, No Drawings

US 9,045,566 B2

METHOD FOR THE MANUFACTURE OF AGAROSE GELS

RELATED APPLICATION

This application is a 371 of PCT/SE2008/050488 filed Apr. 29, 2008 and claims priority under 35 U.S.C. §119 of U.S. Application Ser. No. 60/915,976 filed May 4, 2007.

TECHNICAL FIELD

The present invention relates to a simple and cheap method for manufacturing agarose separation gels, primarily derivatized agarose gels. The gels obtained according to the invention are suitable as supports or solid phases in various kinds of separations, in particular within biosciences and are preferably cross-linked.

BACKGROUND TECHNOLOGY

Agarose gels for separation purposes have been commercially available for at least three decades. By derivatizing the basic gels—either in cross-linked or non-cross-linked form—the gels have been used in separations based on a number of different principles. Two well known product lines are Novarose (Inovata, Bromma, Sweden) and Sepharose (GE Health Care, Uppsala, Sweden).

Agar consists of about equal amounts of agarose and agaropectin both of which are polysaccharides with alternating anhydrogalactose and galactose subunits, i.e. their polysaccharide skeletons are the same. Agaropectin is significantly sulphated and therefore negatively charged. It is also methylated, i.e. contains methoxy groups. Agarose is in essence uncharged and without sulphate groups. Both agar, in particular desulphated agar, and agarose were initially suggested as starting materials for the manufacture of cross-linked separation gels. See for instance U.S. Pat. No. 3,959,251 (Porath et al). However during the years people have focused more on agarose than on agar, most likely due to the high content of sulphate groups of agar (present in agaropectin) and problems with removing the sulphate groups without negatively affecting the quality of the agar base material.

Conventionally agarose gels are obtained by cooling a warm solution of agarose to a temperature below its gelling temperature. The porosity of the gel will vary depending on the concentration of agarose in the starting solutions. A higher concentration will lead to a more dense gel (lower porosity) than a lower concentration. By including certain stabilising reactants in the solution the obtained gel will be stabilised, e.g. by cross-linking. The gel can be obtained in various physical forms such as flat bed, beads, plugs etc. Agarose gels in particulate forms have been obtained by emulsifying a warm solution of agarose in a solvent that is immiscible with water, cooling the solution below the gelling temperature of agarose, and collecting the particles. The sizes of the gel particles will depend on the sizes of the droplets in the emulsion that in turn will depend on stirring, emulgators etc. In practice the emulsifying process is studied in microscopy in order to decide when to stop the emulsifying step. Mostly a certain size fraction is desired which can be accomplished by sieving after the particles have been isolated. By including appropriate cross-linking agents (primarily water-soluble) in the emulsion the particles will be stabilized and the gelling temperature increased. The gel can be functionalised by introducing certain groups or ligands on the gel, e.g. affinity groups (including ion exchange groups) to make the gel suitable for affinity capture such as in affinity chromatography, enzymatically active groups to make the gel suitable for use in enzyme reactors, activated groups in order to enable introduction of any of the previously mentioned groups or as a support phase in solid phase synthesis etc.

Advantageous methods for producing rigid agarose separation gels from agarose and possibly derivatizing them are given in for instance U.S. Pat. No. 4,665,164 (Pernemalm et al), U.S. Pat. No. 4,973,683 (Lindgren G) and WO 1994004192 (Lindgren G).

There is a general desire to circumvent using highly purified and expensive agarose when manufacturing agarose separation gels, in particular cross-linked and/or derivatized forms of such gels. It would be attractive to have a simple method for producing them starting from less expensive material without loosing in performance characteristics compared to conventionally manufactured agarose separation gels.

All patents and patent applications cited herein are incorporated by reference in their entirety.

OBJECTIVE

The primary objective is to provide a method for producing agarose separation gels that avoids the need for highly purified agarose. An alternative method also has to be as simple as previous methods and possible to carry out in the same kind of process equipment as used for previous methods. A new method should avoid complicated extra steps. This objective in particular applies to derivatized variants including among others cross-linked variants.

INVENTION

The first main aspect of the invention is a method for the manufacture of an agarose separation gel. The main characterizing feature is that the method comprises the steps of:
i) providing a solution of agar or partially desulphated agar (=starting agar material), and
ii) one, two or more substeps (ii.A, ii.B, ii.C etc), each of which comprises desulphating the agar material to agarose having a degree of substitution of sulphate groups that is less than, preferably ≤75%, of the degree of substitution of sulphate groups in the starting agar material, for instance native agar,
iii) gelling the dissolved agar material prior to step (ii) and/or securing so that the desulphated agar material is in gel form at least after one or more of the substeps of step (ii), and imperatively after step (ii).

In the context of this specification the term "agar material" will be used for native agar and various partially desulphated forms. Desulphated forms may be used as starting agar material or appear as intermediates during the process. The end product of the method is called agarose separation material.

In addition to the desulphating substeps (ii.A, ii.B, ii.C etc) step (ii) may comprise other substeps, e.g. substeps of one or more sequences S ($S_1$, $S_2$ etc) which each introduces a chemical structure e.g. a covalent cross-link, an affinity group, a reactive group etc. See below. Subsequent to or between substeps involving reaction of the agar material (desulphating substeps and substeps of sequences S) there may be one or more substeps in which excess reagents is removed and/or a desired intermediate or the end product is purified from byproducts and/or excess of reagents. If the agar material is in gel form there may be inserted a filtration/sedimentation substep and/or a washing substep and/or a sieving substep etc. Sieving is only applicable if the agar material of the final gel is in the form of particles and used to remove fractions of particles above and/or below a certain size. If the agar material is in dissolved form there may similarly be inserted a dialysis substep and/or a precipitation substep etc.

The Starting Agar Solution and Gelling (Steps (i) and (iii))

The agar solution in step (i) is prepared by dissolving agar in warm water. The agar typically constitutes ≤25%, such as 20% or ≤15% or ≤10% or ≤7.5% or ≤5% or ≤4% or ≤2% or ≤1% or ≤0.5% (w/w) of the solution. The lowest concentration is typically ≥0.01% (w/w).

The temperature of the initial solution is typically above the gelling temperature of agar, i.e. ≥about 30° C., such as ≥32° C. before any of steps (ii) (iii) have been carried out.

Step (iii) is carried out simply by cooling the solution below the gelling temperature of the agar material. If one desires to carry out any of the substeps of step (ii) with the agar material in gel form it is preferred to insert a cross-linking substep either before or during such substeps (see below). The advantage of working with the agar material in gel form is that, if desired, the material can be easily isolated, washed, sieved (if in particle form) etc between the substeps. If the final/end product is a gel, it is many times advantageous to run certain steps/substeps or the complete process with the material in a gelled state, e.g. to include cross-linking of the agar material prior to or simultaneously with the first desulphating substep or at least before the end product of the method is accomplished. See below under the heading "Introduction of chemical structures".

A gel may be discontinuous or continuous. Discontinuous gels are illustrated with a) gel particles, e.g. a population or a batch of agarose gel particles, preferably in the form of beads, and b) agarose gel coated on the outer surface and/or the inner surfaces of the pores of non-porous or porous particles typically built up of non-gel material etc. Continuous gels are illustrated with a) a flat bed of agar gel or of agarose gel, and b) coats of agar gel and of agarose gels on inner walls of porous integral matrices, such as porous plugs, porous membranes etc, and on inner walls of channel structures.

Beads in the context of the invention means any kind of particles that comprises a rounded shape with preference for spheroids including forms such as spheres, drops, nudles, beans etc. Gel particles, e.g. in the form of beads, may have been obtained by gelling an agar solution that is suspended in a solvent that is immiscible with water.

If the starting gel, i.e. the gel formed in step (iii) is in the form of particles they typically have a mean size selected within the interval 1-1000 μm, such as ≤500 μm or ≤200 μm or ≤100 μm or ≤50 μm or ≤25 μm and/or ≥10 μm or ≥15 μm or ≥25 μm or ≥50 μm or ≥100 μm or ≥200 μm. A typical particle batch to be provided in step (i) has ≥40%, such as ≥50% or ≥75% or ≥85%≥ or ≥90% or ≥95% of its particles distributed within a size interval with a width of ≤100 μm, such as ≤75 μm or ≤50 μm or ≤25 μm or ≤10 μm. In preferred particle batches 40%, such as ≥50% or ≥75% or ≥85%≥ or ≥90% or ≥95%, of the particles have sizes within the interval of the mean size±1000%, such as ±500% or ±100% or ±50% or ±25% or ±10%, of the mean particle size. In this context "size" refer to the diameter of a particle. For an irregular particle this means the largest distance between two sides of the particle. Although the particle size may change during the method of the invention these ranges apply in principle also to the particles obtained as an end product of the innovative method (if also in particle form).

Channel structures are covered or uncovered and have various kinds of cross-section, such as circular, triangular, rectangular etc. Cross-sectional dimensions may be in the μm-range or larger where the μm-range typically means that at least one cross-sectional dimension is ≤5000 μm, such as 1000 μm and also cover cross-sectional dimensions<1 μm. The term "channel structure" encompasses tubes.

Removal of sulphate Groups (Substeps ii.A, ii.B, etc)

Desulphating (substeps ii.A, ii.B, etc) typically means hydrolysis of sulphate groups directly to hydroxyls but include also other mechanisms and/or ways for lowering the degree of substitution of sulphate groups. Desulphating thus also encompasses that A) the sulphate group is replaced with a halide ion or some other nucleophile (if nucleophiles other than $H_2O/OH^-$ are present during a desulphating step) to replace the sulphate group with a group which is effective as a leaving group capable of being replaced with hydroxyl during conditions provided during a desulphating step, or B) transformation of a sulphate group to a substituent other than hydroxy and stable during the conditions provided during a desulphating step. Alternative (B) may be illustrated with transformation of a sulphate group to various kinds of ether bound groups, such as alkoxy, alkenoxy or hydroxy alkenoxy, e.g. methoxy, ethoxy, propoxy, propenoxy (=allyl ether), corresponding hydroxy alkoxy and alkenoxy groups with at most one oxygen bound to the same carbon atom (e.g. nucleophilic attack of the sulphate ester oxygen, C—O—S, on the allyl carbon), etc. Desulphating is typically taking place at a pH≥10, preferably ≥12 or ≥13, preferably with hydroxide ion in excess. Typical hydroxide ion concentrations are ≥0.1 M, such as ≥1 M. The hydroxides used are typically soluble, for instance alkali metal hydroxide, such as sodium or potassium hydroxide. The pH as well as the concentration and type of metal hydroxide may vary for the different substeps ii.A, ii.B, etc.

The number of substeps for removing sulphate groups depends on what is acceptable with respect to sulphate content for the intended use of the end product of the innovative method. For a small reduction, such as up to 25%, it may suffice with one or two substeps ii.A, ii.B, etc. For more significant reductions, such as 50% or more 5, 6, 7 or more substeps may be required. Typically it would suffice with 3-10 substeps ii.A, ii.B etc. The sulphate content or the degree of substitution of sulphate groups in the end product of the method should typically be ≤75%, such as ≤50% or ≤25% or ≤10% or ≤5%, of the sulphate content or degree of substitution of the starting agar material. Sulphate content is typically measured as sulphur content.

The agar material may be in a gelled state or in a dissolved state during a desulphating substep (ii.A, ii.B etc). If the end product of the innovative method is in particulate form, for instance beads, it is at the priority date preferred to perform the desulphating substeps (ii.A, ii.B etc) with the agar material in a gelled state in emulsion. To secure the gelled state the agar material can be subjected to cross-linking prior to the first desulphating substep or during the sequence of substeps containing the desulphating substeps (ii.A, ii.B etc) or to perform the reaction at a sufficiently low temperature below the gelling temperature of the agar material. It is believed that for physical formats of the end product other than beads there may be advantages to work with the agar material in a dissolved state, although there may then also be advantages to switch to a gelled state at certain stages of the method, for instance when excess reactants are to be removed from the agar material after a desulphating substep, after a substep of a cross-linking sequence and/or after a cross-linking sequence and/or after all desulphating substeps have been carried out.

Introduction of Chemical Structures (Sequences $S_1$, $S_2$ etc with Substeps $ii.1_1$, $ii.2_1$ etc; $ii.1_2$, $ii.2_2$ etc)

In preferred variants, step (ii) may comprise, in addition to desulphating substeps (ii.A, ii.B, ii.C etc), one or more sequences ($S_1$, $S_2$ etc) each of which comprises one or more substeps (ii.1$_1$, ii.2$_1$ etc; ii.1$_2$, ii.2$_2$ etc) for introduction of a chemical structure which may be different between the sequences and possibly will be present in the end product.

Depending on the structure to be introduced and conditions selected the introduction may take place in one single substep or in a step-wise fashion. Three typical main kinds of chemical structures that may be introduced are: a) cross-linking structures, b) affinity groups, such as ion exchange groups, (see (c) below), and c) groups that can be used for further functionalization, i.e. reactive and/or activated groups. Further functionalization encompasses amongst other introduction of affinity groups that typically are selected amongst members of affinity pairs such as a) hapten/antigen and anti-hapten/antigen antibodies including various hapten-binding antibody fragments including recombinant forms and binding forms obtained by various combinatorial techniques, e.g. affibodies, b) complementary nucleic acids, c) carbohydrate structures and lectins, d) Ig-binding microbial proteins, such as protein A, G etc, and immunoglobulin constant regions, e) chelating groups and metal ions, f) chelates and cystein- and serine-containing proteins/polypeptides, g) members in enzymatic systems such as enzymes as such, substrates, cosubstrates, cofactors, coenzymes etc (i.e. enzymatically active groups), h) complementary charged groups (e.g. ion exchange groups) etc.

In preferred variants one or more of the desulphating substeps (ii.A, ii.B, ii.C etc) coincide fully or at least partly with a substep (ii.1, ii.2 etc) in at least one of the sequences ($S_1$, $S_2$ etc). This means that it is also preferred to select the route for introduction of a chemical structure discussed above so that it comprises at least one substep (ii.1$_1$, ii.2$_1$ etc) that is carried out under desulphating conditions, preferably alkaline desulphating conditions.

In preferred variants a final chemical structure and/or an intermediary structure created in a substep of a sequence S shall physically and/or chemically stabilize the gel structure thereby facilitating desulphating during the same or a subsequent substep. Stabilizing structures are typically cross-linking.

Provided a sequence S comprises two or more substeps (ii.1, ii.2 etc) then the chemical structure is introduced in a step-wise fashion. The individual substeps of a sequence S may correspond to:

Substep ii.1) transforming a first structure to a second structure where the first structure is present in the agar material at the start of the sequence and/or has been introduced as an intermediary structure in a previous substep of step (ii), Substep ii.2) transforming the second structure to a third structure that is an intermediary structure, Substep ii.3) transforming the third structure to a fourth structure that i) is present in the agar material after the end of the sequence (i.e. the fourth structure is equal to the desired chemical structure of the end product), or ii) is an intermediary structure, Substep ii.4) possibly performing substeps (ii.1-iii.4) a predetermined number of times, i.e. a second time, a third time until the desired chemical structure and/or the desired degree of substitution of desired chemical structure have been accomplished on the gel, i.e. on the end product (the agarose separation gel).

When the substeps (ii.1)-(ii.4) are repeated a predetermined number of times corresponding conditions and/or reagents may differ between at least two, three or more of the rounds the substeps (ii.1)-(ii.4) are carried out. The difference may be, for instance, with regard to the reagents used. If a substep (ii.1) in one round for instance utilizes a particular bifunctional reagent of the kinds discussed below, the length of B, the groups Z and Y, the structure/group created by activation of Y, etc may differ for other rounds. This includes that other conditions are also adapted to the actual bifunctional reagent used in a particular round.

In preferred variants of a sequence S that comprises substeps (ii.1)-(ii.4), at least one of these substeps utilizes desulphating conditions, preferably alkaline conditions, so that this substep and a substep for removing sulphate groups can be carried out simultaneously. In other cases the removal of sulphate groups is carried out as a separate substep prior to the sequence and/or between two substeps of the sequence and/or subsequent to the sequence.

A preferred variant includes that

Substep (ii.1) comprises transformation of hydroxyls of the agar material to a structure that comprises unsaturation, e.g. by reacting hydroxyls of the agar material with unsaturated alkyl halide (hetero bifunctional reagent) under desulphating alkaline conditions, typically pH≥10, such as ≥12 or ≥13 and an excess of OH$^-$.

Substep (ii.2) comprises transformation of the unsaturation to a structure that comprises halohydrin (—CH(OH)CHX—) or vicinal dihalide (—CHXCHX—) (X=halogen), e.g. by addition of hypohalite (HOX/XO$^-$) or halogen ($X_2$) under moderate pH-conditions to the unsaturation. X is preferably Br.

Substep (ii.3) comprises transformation of the halohydrin and vicinal dihalide to a vicinal dialcohol by reaction with water and/or to cross-linking by reaction with hydroxyls of the agar material. Epoxide may be formed but will react either in this substep or in a subsequent alkaline substep in the same manner as a halohydrin and vicinal dihalide. The pH conditions are typically alkaline, at least initially. Desulphating may take place either by direct hydrolysis of the sulphate groups or by the alternative mechanisms discussed above.

Substep (ii.4) comprises performing substeps (ii.1)-(ii.3) a second time, a third time etc, I) until cross-linking gives the gel a predetermined rigidity, or II) stopping the final repetition after a halohydrin/vicinal dihalide or epoxide has been introduced and use these groups for functionalizing of the end product, e.g. with affinity groups.

Alternatively at least one, two or more of the repetitions according to (ii.4) are performed with a bifunctional reagent other than the unsaturated alkyl halide used in substep (ii.1) with subsequent changes in substeps (ii.2) and (iii.3), for instance with another kind of unsaturated alkyl halide or a completely different bifunctional reagent, such as a homobifunctional reagent or a different heterobifunctional reagent, for instance of the kinds discussed below. The conditions and/or other reagents used in a particular round of the substeps are adapted to the selected bifunctional reagent.

The transformations discussed above are typically carried out by the use of a reagent that comprises at least two functional groups each of which is capable of forming a covalent linkage to hydroxyl oxygens of the agar material (=bifunctional reagents). One kind of bifunctional reagents used in the invention is heterobifunctional in the sense that one of the functional groups of the reagent reacts with hydroxyls of the agar material while the other one is dormant needing activation/transformation to a group that easily reacts with hydroxyls. When applied to the present invention this kind of reagent requires a sequence S that typically comprises at least three substeps—one for the first functional group to react with hydroxyls, one for activation of the second functional group, and one for reacting the activated group with hydroxyls or other nucleophiles. Another kind of bifunctional reagent used in the invention is homobifunctional in the sense that all of the functional groups are capable of directly reacting with hydroxyls of the agar material. Provided the distance between the functional group is appropriate homobifunctional reagents implicates introduction of cross-linking structures in one single substep when used in the invention. Reagents which transform hydroxyls on the agar material to ether linkages are preferred For both kinds of bifunctional reagents it is many time advantageous to repeat the part sequence leading to the cross-linking structure. The intended use of the end product of the innovative method may for instance require a rigidity of the gel that needs repetition of the substeps leading to cross-linking.

Suitable bifunctional reagents to be used as a starting reagent in substep (ii.1) of a sequence S have the general structure

Z—B—Y

B is a bridge in which there is a straight hydrocarbon chain typically containing 1-15, such as ≤12 or ≤10, carbons, possibly with oxygen inserted between two carbons at one, two, three or more positions and possibly substituted with lower alkyl, lower alkoxy groups, and/or via lower alkylene groups further groups X and/or Y. Hydroxy as a substituent may be present if the various groups Z and Y are properly selected. At most one oxygen atom binds to the same carbon in B. Lower alkyl, lower alkoxy and lower alkylene mean alkylene/alkyl/alkoxy containing at most 10, such as at most 7, carbon atoms where there may be oxygen atoms inserted at one or more positions. The carbons are preferably saturated in the sense that they are $sp^3$-hybridised and typically bind only atoms selected amongst oxygen, carbon and hydrogen. B is preferably hydrophilic in the sense that the ratio between the number of carbon atoms and the number of oxygen is ≤4, such as ≤3 or ≤2.

In hetero and homo bifunctional reagents to be used in the invention a functional group Z and/or Y is typically directly attached to a $sp^3$-hydrized carbon in B.

Functional groups Z and Y that are reactive with hydroxyls on the agar material are typically selected amongst groups that lead to a stable linkage between the reagent and a hydroxyl oxygen, preferably to an ether linkage. Typically such Z and Y groups are halo, such as fluoro, chloro, bromo and iodo, tosylate, brosylate, etc, halohydrin, epoxy, vicinal, dihalo etc. Typical functional groups Y that must be activated before being capable of reaction with hydroxyls in the agar material are unsaturated groups (alkene and alkyne) that are activated by addition of halogen or hypohalous acid/hypohalite across the unsaturation followed, if needed, by conversion to halohydrin/epoxide. Other potential Y groups that need activation in order to be able to react with hydroxyls are nucleophilic and are converted to structures that comprise electrophilic groups in the activation process, i.e. they have a reactivity that is opposite to the Z group that typically is electrophilic.

Affinity groups of the type discussed above can easily be covalently introduced on the agar material according to the invention by using a sequence S that is at least partly different from a sequence S that leads to cross-linking. Also other sequences can be used once the final base separation gel has been obtained.

Introduction of affinity groups on the agar material utilizes according to the invention preferably heterobifunctional reagents of the type discussed above, typically by first immobilizing the reagent via its Z end to the agar material followed by immobilizing a compound comprising the desired affinity (affinity compound) via the Y end of the same reagent. If a nucleophilic group on the affinity compound is used for the immobilization, the Y group typically first will be activated/transformed to a structure comprising an electrophilic group. Alternatively a nucleophilic group on the affinity compound is activated/transformed to a structure comprising an electrophilic group that is reactive with the nucleophilic group Y of the heterobifunctional reagent. In order to avoid cross-linking in parallel with linking an affinity compound which contains a nucleophilic group, it is appropriate to select a bifunctional reagent in which the hydrocarbon chain of B is not sufficiently long to allow cross-linking and/or avoid extending the cross-linking chain by repetition of the first substeps of the sequence S utilized. See for instance WO 1994004192 (Lindgren G).

Typically nucleophilic centers that may be present on an affinity compound and can be used for immobilizing the affinity compound to the polysaccharide chains of the agar material are amino (primary, secondary or tertiary), hydroxyl and mercapto. During the immobilization process the amino groups are preferably transformed to amino/ammonium or amido, e.g. primary amino to secondary amino or amido, secondary to tertiary amino or amido and tertiary to quaternary ammonium; hydroxyl to ether, preferably dialkyl ether, and mercapto to thioether preferably dialkyl thioether.

Homobifunctional reagents that are suitable for use in the invention are various kinds of bis-epoxides, epihalohydrine, dihalider, etc. A very preferred heterobifunctional reagent is allyl halide since it is easy to control the step-wise building (three carbons at a time) of spacer structures when immobilizing affinity ligands by the use of this reagent and of cross-linking structures (WO 1004004192 Lindgren G; and U.S. Pat. No. 4,973,683 Lindgren G).

The second main aspect of the invention is an agarose separation gel. The characterizing features are that agarose in the gel comprises
a) a plurality of methoxy groups each of which are at the same position as in native agar with a degree of substitution that is in the range of 1-100%, typically ≥50%, such as ≥75% or ≥80% or ≥95%, of the degree of substitution of native agar, and
b) a plurality of sulphate groups with a degree of substitution which is ≤75%, such as ≤50% or ≤25% or ≤10% or ≤1%≤0.5 of the degree of substitution for sulphate groups in native agar.

Further physical and chemical characteristics are as discussed above and in the appended claims. Typically there are cross-linking structures B' between oxygens that are directly attached to the polysaccharide chains of the agar material. B' preferably comprises structural elements selected amongst the same structural elements as B of the bifunctional reagent. Affinity groups and/or reactive structures are linked to the agarose polysaccharide skeleton via a spacer B" that in the same manner as the cross-linking structure B' may comprise structural elements selected from the same group of structural elements as may be present in B and/or B'.

The separation gel according to the invention will find use for separations based on electrophoresis, size exclusion and/or adsorption principles, where adsorption principles include ion exchange binding, bioaffinity binding such as immune adsorption etc and is independent of the separation taking place in batch-like processes or chromatographic processes.obtained gel. The primary field will be bioscience including also food industry.

BEST MODE

The best mode is given in the experimental part and also includes embodiments according to preferred and advantageous embodiments outlined in this specification.

Experimental Part

Example 1

Synthesis of an Agarose Separation Gel from Agar. Step-Wise Cross-Linking in Parallel with Step-Wise Desulphating Spherical agar beads were prepared using traditional method in a two phase system (water/toluene) with a suitable emulgator. The beads were classified in two different fractions by sieving in which the beads have diameters within the intervals of 200-300 μm and 40-60 μm, respectively.

To 500 ml of fraction 1 (diameters 200-300 μm) 90 grams of freshly distilled allylbromide and 9 ml sodium borohydride together with 190 gram sodium hydroxide (5.26 mmolg) and 700 ml of water was added. Reaction was allowed to proceed under stirring overnight. The beads were then washed on a glass-funnel with water until neutral pH. 1 gram of the gel was dried on a glass-funnel with acetone and its sulphur content was determined with elemental analysis (Table 1). The reaction was repeated a second time and analysed for sulphur. As comparison the sulphur contents of agar and agarose are included (Table 1.)

TABLE 1

| Material | SULPHUR CONTENT (%) |
|---|---|
| Agar | 0.6 |
| Agar material after Cross-linking step 1 | 0.3 |
| Agar material after Cross-linking step 2 | 0.1 |
| Native agarose | 0.05 |

The synthesis was essentially as generally outlined for polysaccharide gels in outlined in U.S. Pat. No. 4,973,683 (Lindgren, G) and is particularly well adapted to result in rigid beads allowing high flow rates and high pressure differences across columns packed with the beads, e.g. in the large scale treatment of beverages. Compare example 2.

Example 2

A. Introduction of Adsorptive Ligands that are Capable of Adsorbing Polyphenolic Substances Via n-π and π-π Interaction and B. Adsorption of Polyphenols from a Beverage 100 ml of the cross-linked large beads, diameters 200-300 μm, from example 1 were treated with an excess of epichlorohydrin in alkaline solution to form clustered ether groups.

A short column (25×50 mm) was packed with the beads and connected to a pump and equilibrated with water. Beer that had been degassed under vacuum for approximately 1 hour until no foam was created was allowed to run through the column at high flow rate (5 mL/min, 60 cm/min). After approximately 200 mL, samples of the processed beer were taken for analysis. The amount of polyphenols and proteins in the beer were measured before and after passing the column. Polyphenols were determined using the "Total Polyphenols in Beer by Spectroscopy" as described in Analytica-EBC Section 9 Beer Method 9.11. Total protein was measured by the use of "Quick Start Bradford Protein Assay" (Bio-Rad Laboratories, Inc, Hercules, Calif., USA) (Bradford et al., Anal. Biochem. 72 (1976) 248-254).

The uptake of polyphenols was 25% and of proteins insignificant, i.e. the polyphenol content was lowered 25% and the protein content was unchanged by passing the beer through the adsorbent.

Example 3

Introduction of Adsorptive Ligands that are Capable of Increasing the Adsorption of Polyphenols and of Proteins. Adsorption from a Beverage Beads synthesized according to example 2 were further derivatized with hydrophobic alkyl groups by treatment with excess of propylene oxide. The beads were packed in a column of the same kind as in example 2. The same kind of beer as used in example 2 was allowed to pass through the adsorbent. Polyphenols and total protein were measured in the beer before and after passing the adsorbent in the same manner as in example 2. The uptake of polyphenolic substances and of proteins was 35% and 25%, respectively.

Example 4

Agarose Separation Gel Suitable for Size Exclusion Chromatography (SEC)

The gel was prepared essentially as described in example 1 in of EP 203049 and U.S. Pat. No. 4,973,683 except that the polysaccharide material was replaced with the corresponding amount of agar. The number of cycles with allyl halide was three. The product was sieved and the fraction 40-60 μm was collected and tested in size exclusion chromatography with thyroglobulin, ferritin, IgG, bovine serum albumin, ovalbumin, myoglobulin and ribonuclease by measuring $K_{av}$ for the different proteins. An essentially linear plot log $M_w$ versus $K_{av}$ was obtained indicating that by the use of the inventive method one can obtain size exclusion material with at least the same performance characteristics as when starting from agarose.

While the invention has been described and pointed out with reference to operative embodiments thereof, it will be understood by those skilled in the art that various changes, modifications, substitutions and omissions can be made without departing from the spirit of the invention. It is intended therefore that the invention embraces those equivalents within the scope of the claims which follow.

The invention claimed is:

1. A method for the manufacture of an agarose separation gel, comprising the steps of:
   i) providing agar material comprising a solution of agar or partially desulphated agar,
   ii) two or more substeps (ii.A, ii.B, ii.C etc) that comprise removing natively occurring sulphate groups, thereby transforming the agar material to agarose having a degree of substitution of sulphate groups that is less than the degree of substitution of sulphate groups in the starting agar material, and
   iii) gelling the solution of agar material prior to step (ii) by cooling the solution to a temperature below the gelling temperature of the starting agar material and securing the desulphated agar material in gel form during the complete process of the substeps of step (ii),
   wherein step (ii), in addition to the desulphating substeps (ii.A, ii.B, ii.C etc), further comprises a sequence ($S_1$)

which comprises one or more substeps (ii.$1_1$, ii.$2_1$ etc) and introduces a cross-linking structure into the gel under alkaline desulphating conditions, and wherein one or more of the desulphating substeps (ii.A, ii.B, ii.S etc) coincides with a substep (ii.1, ii.2 etc) of sequence ($S_1$).

2. The method of claim 1, wherein the removing comprises replacing sulphate groups with hydroxyl groups.

3. The method of claim 1, wherein the gel form is in the form of beads.

4. The method of claim 1, wherein said desulphating in at least one of said substeps comprises alkaline hydrolysis performed in aqueous solution at a pH≥10, in the presence of a soluble metal hydroxide at a concentration of hydroxide≥0.1 M.

5. The method of claim 1, wherein step (ii), in addition to the desulphating substep (ii.A, ii.B, ii.C etc) and the sequence ($S_1$), comprises one or more sequences ($S_2$ etc), each of which comprises one or more substeps (ii.$1_2$, ii.$2_2$ etc; etc) and introduces a chemical structure which is different between the respective sequences ($S_1$, $S_2$ etc) and is present in the gel product.

6. The method claim 5, wherein at least one of the sequences ($S_2$ etc) introduces a chemical structure that is a functional group.

7. The method of claim 5, wherein one or more of the substeps (ii.A, ii.B, ii.C etc) coincides at least partly with a substep (ii.1, ii.2 etc) in at least one of the sequences ($S_2$ etc).

8. The method of claim 5, wherein at least one of the sequences ($S_1$, $S_2$ etc) comprises the substeps of:
 ii.1) transforming a first structure to a second structure where the first structure is present in the agar material at the start of said at least one sequence or has been introduced as an intermediary structure in a previous substep,
 ii.2) transforming the second structure to a third structure that is an intermediary structure,
 ii.3) transforming the third structure to a fourth structure that is present in the agar material wherein the fourth structure is equal to a chemical structure that is present in the end product, or is an intermediary structure in substep (ii),
 ii.4) performing substeps (ii.1-ii.3) a predetermined number of times until the desired chemical structure has been accomplished on the gel.

9. The method of claim 8, wherein
 substep (ii.1) comprises transformation of hydroxyl to a structure comprising unsaturation,
 substep (ii.2) comprises transformation of the unsaturation to a structure that comprises halohydrin or vicinal halide by addition of hypohalite or halogen under moderate pH-conditions,
 substep (iii.3) comprises transformation of the halohydrin or vicinal halide to a vicinal dialcohol under alkaline conditions, and
 substep (ii.4) comprises performing substeps (ii.1-ii.3) a second time, a third time etc, until a cross-linking giving the gel a predetermined rigidity or as an alternative stopping the final repetition after a halohydrin/vicinal dihalide or epoxide has been introduced in substep ii.2.

10. The method of claim 9, wherein the transformation of hydroxyl to a structure comprising unsaturation is achieved by reacting hydroxyl with an unsaturated alkyl halide under alkaline conditions.

11. The method of claim 8, wherein the chemical structure is selected from the group consisting of a) a cross-linking structure, b) a reactive structure that is to be used for further derivatization of the gel, and c) an affinity structure.

12. The method of claim 5, wherein the chemical structure is an affinity group, or a group that can be used for further functionalization.

13. The method of claim 1, wherein the gel provided in step (iii) is in the form of particles having a mean size selected within the interval 1-1000 μm, with the particles saturated with water.

14. The method of claim 1, wherein the gel provided in step (iii) is in the form of beads with ≥40 of the particles having sizes within the interval of the mean size±1000% of the mean bead size with the beads saturated with water.

15. The method of claim 1, wherein the concentration of agar in the solution provided in step (i) is ≤25% (w/w).

16. The method of claim 1, wherein the number of desulphating steps is two or more.

17. The method of claim 1, wherein excess of reactants and/or byproducts formed during a substep are removed after the substep.

18. The method of claim 1, wherein the agar material is transformed to agarose having a degree of substitution of sulphate groups that is ≤75% of the degree of substitution of sulphate groups in the starting agar material.

19. The method of claim 1, wherein the number of desulphating steps is three or more.

20. The method of claim 1, wherein the number of desulphating steps is three or more.

* * * * *